United States Patent [19]

D'Apuzzo et al.

[11] Patent Number: 5,450,476
[45] Date of Patent: Sep. 12, 1995

[54] METHOD AND SYSTEM FOR PROVIDING NONPUBLISHED NUMBER MESSAGING SERVICE

[75] Inventors: Ronald F. D'Apuzzo, Toms River, N.J.; Andrea Parascandolo, Staten Island, N.Y.

[73] Assignee: Bell Communications Research, Inc., Livingston, N.J.

[21] Appl. No.: 156,117

[22] Filed: Nov. 22, 1993

[51] Int. Cl.⁶ .................. H04M 3/50; H04M 7/00
[52] U.S. Cl. ..................... 379/88; 379/212; 379/213
[58] Field of Search .............. 379/67, 88, 89, 70, 379/84, 201, 210, 211, 212, 213, 214

[56] References Cited

U.S. PATENT DOCUMENTS

| | | | |
|---|---|---|---|
| 4,959,855 | 9/1990 | Daudelin | 379/88 |
| 5,058,152 | 10/1991 | Solomon et al. | 379/67 |
| 5,181,237 | 1/1993 | Dowden et al. | 379/212 |
| 5,327,493 | 7/1994 | Richmond et al. | 379/372 |

Primary Examiner—Jeffery A. Hofsass
Assistant Examiner—Fan Tsang
Attorney, Agent, or Firm—Leonard Charles Suchyta; James W. Falk

[57] ABSTRACT

A Nonpublished Number Messaging (NPNM) system allows a caller to leave a message for a party having a nonpublished telephone number. When a caller calls directory assistance to request a telephone number, an operator service system (OSS) switch routes the call to a directory assistance operator. The operator enters the requested listing into an operator console and a search is made in an OSS database (DB). When it is determined that the requested telephone number is nonpublished, the OSS switch routes the call to an audio response unit (ARU), which plays a recorded message, and then routes the call to a voice mail service (VMS) provider. The VMS Provider records a message left by the caller and then delivers it to the appropriate party.

6 Claims, 3 Drawing Sheets

METHOD AND SYSTEM FOR PROVIDING NONPUBLISHED NUMBER MESSAGING SERVICE

BACKGROUND OF THE INVENTION

The present invention relates generally to the field of directory assistance services, and more particularly to contacting a party having a nonpublished telephone number using directory assistance services.

Communication plays an increasingly large role in today's society, and the telephone continues to be one of the principal means of communication. Directory assistance services assist callers in locating and calling other parties. If a calling party does not know the telephone number of a party, a directory assistance operator can provide the information, as long as the telephone number is published.

To assist a caller requesting a telephone number from a directory assistance operator, a service called Directory Assistance Call Completion ("DACC") has been implemented. Under DACC, when a caller requests a published telephone number from a directory assistance operator, the caller is given the option to have the call automatically routed to the requested telephone number for a small charge. In this way, DACC provides a convenience to the caller by eliminating the need to record and dial the telephone number provided by the operator.

Many people, however, choose to have their telephone numbers nonpublished, to maintain their privacy. By not publishing a telephone number, a person can limit the distribution of his telephone number to those people he has an interest in, while avoiding unwanted telephone calls from strangers or others he has no interest in.

People with nonpublished telephone numbers may also be interested, however, in hearing from many people who do not know the person's telephone number. Directory assistance operators are no help here because they cannot distribute nonpublished telephone numbers. This presents a serious problem, particularly in emergencies.

Under the current system, a person must publish his telephone number and sacrifice his privacy or refuse to publish his telephone number and remain unreachable to many callers. Either choice presents problems to both calling and called parties, leaving a void in today's directory assistance services.

Accordingly, it is desirable to allow a caller to contact a party having a nonpublished telephone number without disclosing the telephone number.

It is also desirable to allow a caller to leave a message for a party having a nonpublished telephone number.

It is also desirable to provide an automated system for allowing a caller to leave a message for a party having a nonpublished telephone number.

It is also desirable to allow a party to have a nonpublished telephone number, yet remain accessible to callers.

Additional desires of the invention will be set forth in the description which follows, and in part will be apparent from the description, or may be learned by practice of the invention. The advantages of the invention may be realized and obtained by means of the instrumentalities and combinations particularly pointed out in the appended claims.

DISCLOSURE OF THE INVENTION

To achieve the foregoing desires and objects, and in accordance with the purposes of the invention as embodied and broadly described herein, the present invention provides a method of providing a Nonpublished Number Messaging ("NPNM") service, comprising the steps of receiving a call requesting a telephone number corresponding to a called party, accessing telephone information about the called party, determining that the requested telephone number is nonpublished, and recording a message for the called party if the called party's telephone number is nonpublished.

Further, the present invention provides a system for providing NPNM service, comprising a switch, a database connected to the switch and storing information about telephone customers, an operator console connected to the switch and the database for accessing the information about telephone customers and determining whether a called party has a nonpublished telephone number, and a voice mail service connected to the switch for recording a message from a caller when the called party has a nonpublished telephone number.

BRIEF DESCRIPTION OF THE DRAWINGS

The accompanying drawings, which are incorporated in and constitute a part of this specification, illustrate an embodiment of the invention and, together with the description, serve to explain the objects, advantages, and principles of the invention.

In the drawings.

BEST MODE FOR CARRYING OUT THE INVENTION

According to the present invention, an NPNM system allows a caller requesting a nonpublished telephone number from a directory assistance service to leave a message for the party having the nonpublished telephone number.

Figure 1:
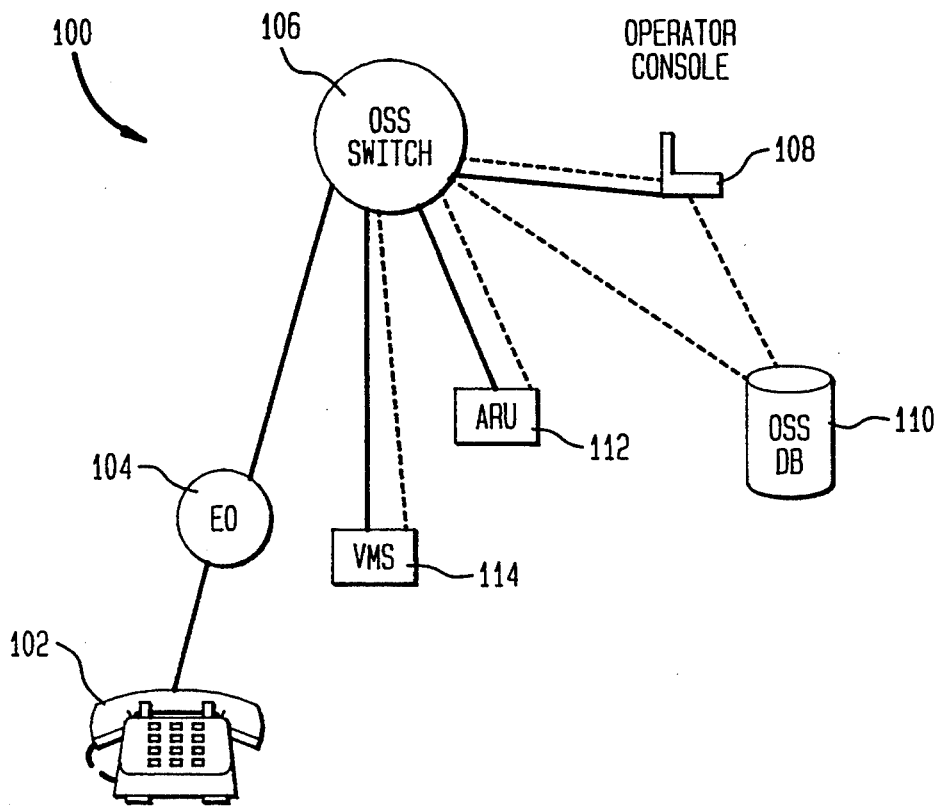
FIG. 1 illustrates an NPNM system in accordance with one embodiment of the present invention.

FIG. 1 shows a preferred embodiment of NPNM system 100, which includes a plurality of telephones 102 (only one shown), End Office (EO) 104, Operator Service System (OSS) Switch 106, Operator Console 108, OSS Database (DB) 110, Audio Response Unit (ARU) 112, and a plurality of Voice Mail Service (VMS) Providers 114 (only one shown).

As shown by the solid lines in FIG. 1, OSS Switch 106 is configured for voice communication with EO 104, Operator Console 108, ARU 112, and VMS Provider 114. Also, as shown by the dotted lines in FIG. 1, OSS Switch 106 is configured for data communication with Operator Console 108, OSS DB 110, ARU 112, and VMS 114. In addition, as shown by the dotted line in FIG. 1, Operator Console 108 is also configured for data communication with OSS DB 110.

When a call is made from telephone 102 to a directory assistance service, the call is received by EO 104. In a preferred embodiment, EO 104 is a facility that contains switching equipment which routes a received call for directory assistance to OSS Switch 106.

OSS Switch 106 initially routes a received call for directory assistance to Operator Console 108. As explained below in more detail, based on data received from OSS DB 110, OSS Switch 106 can also determine whether the NPNM service is available to the caller and can route the call to ARU 112. If the caller indicates an interest in leaving a message, OSS Switch 106 can also route the call to VMS Provider 114 along with data.

When the call is routed to Operator Console 108, voice communication is established between a directory assistance operator (not shown) at Operator Console 108 and the caller. The caller asks the operator for the telephone number of a party (hereinafter referred to as the called party). The operator searches OSS DB 110 for the requested telephone number by entering an appropriate search term into Operator Console 108. Operator Console 108 transmits the requested search to OSS DB 110 and provides the operator with data received from OSS DB 110. In a preferred embodiment, Operator Console 108 is a Northern Telecom TOPS MPX or a console of similar type.

In an alternative embodiment, Operator Console 108 can be automated to obtain information from the caller concerning a requested telephone number without the aid of an operator. For example, Operator Console 108 can prompt the caller to respond to inquiries by pressing buttons on the telephone key pad. Once Operator Console 108 obtains the information from the caller, Operator Console 108 transmits search terms to OSS DB 110 and waits to receive the requested information from OSS DB 110.

Figure 2:
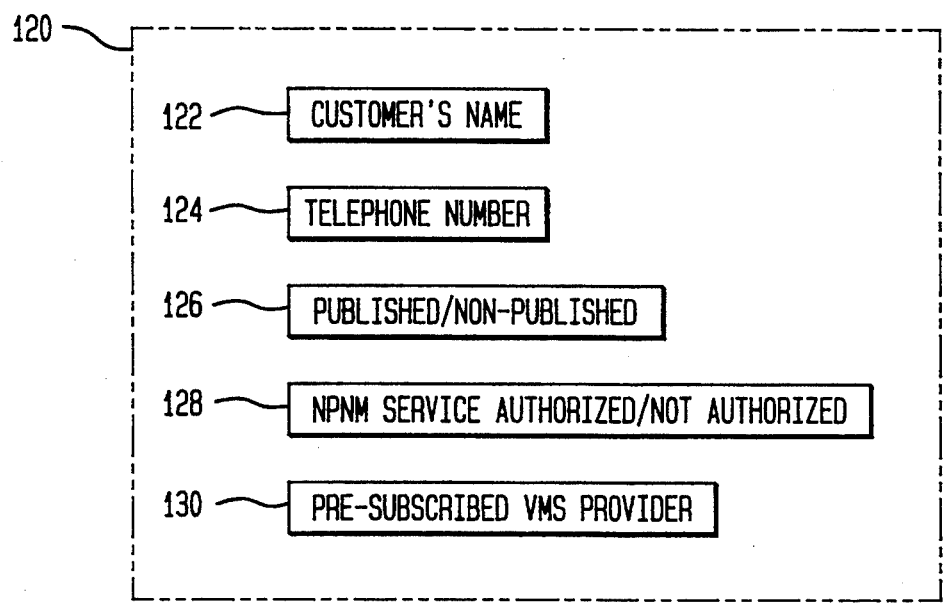
FIG. 2 shows a sample customer record in accordance with the present invention.

OSS DB 110 stores customer records containing data about each telephone customer within a predefined geographic region. While various types of data can be stored about each customer in OSS DB 110, FIG. 2 shows a preferred customer record 120 including exemplary data fields. As shown in FIG. 2, customer record 120 preferably includes the customer's name (field 122), customer's telephone number (field 124), an indication of whether the customer's telephone number is published (field 126), an indication of whether the customer has authorized the NPNM service (field 128), and, if so, identification of the customer's subscribed VMS provider (field 130).

OSS DB 110 transmits a customer record corresponding to the called party to OSS Switch 106, which routes the call to ARU 112 if it determines that the NPNM service is available. ARU 112 plays a recorded announcement to the caller describing the NPNM service. At the end of the recorded announcement, ARU 112 prompts the caller to press a predetermined key on his telephone indicating an interest to leave a message for the called party. In a preferred embodiment, ARU 112 is a Northern Telecom Voice Service Node or an audio response unit of similar type.

If the caller presses the predetermined key, OSS Switch 106 routes the call to the VMS Provider 114 identified in data field 130 of the customer record, along with the customer record. VMS Provider 114 records a message left by the caller and, later, delivers the message to the called party as described in more detail below.

Figure 3:
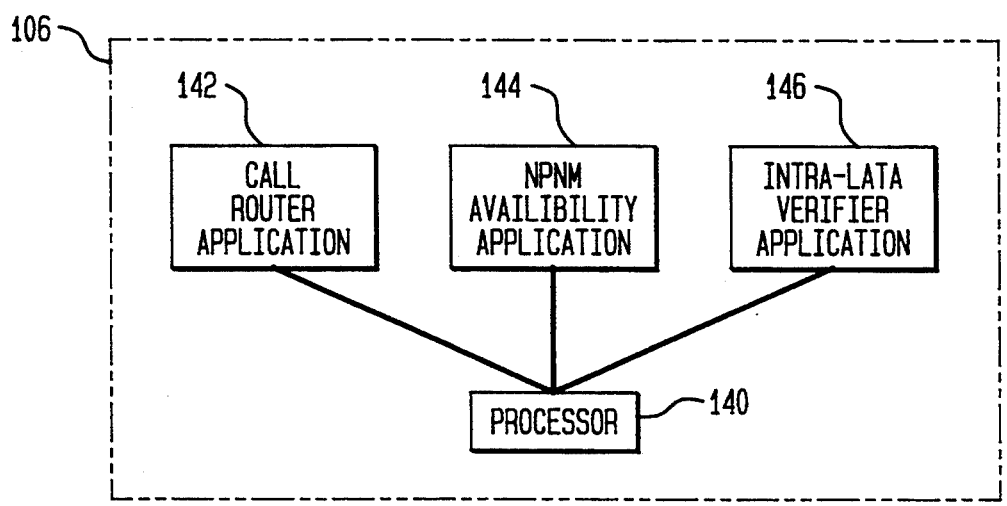
FIG. 3 is a block diagram of a switch in accordance with one embodiment of the present invention.

FIG. 3 is a block diagram of OSS Switch 106. In a preferred embodiment, OSS Switch 106 comprises processor 140, which is programmed to perform applications as shown in FIG. 3.

Call Router Application 142 is responsible for routing calls to the appropriate location. When OSS Switch 106 initially receives a call from EO 104, Call Router Application 142 routes the call to Operator Console 108. If NPNM service is available to the caller, then Call Router Application 142 routes the call to ARU 112, which plays a recorded message to the caller. If the caller presses the appropriate key after being prompted by ARU 112, Call Router Application 142 routes the call from ARU 112 to the VMS Provider 114 indicated in data field 130 of the customer record.

NPNM Availability Application 144 is responsible for determining whether NPNM service is available according to the customer record received from OSS DB 110. NPNM Availability Application 144 checks to see whether the telephone number is nonpublished and whether the called party authorized the NPNM service by checking data field 126 and data field 128, respectively, of the customer record.

Further, the NPNM service is preferably available only where DACC service is available and where the requested telephone number, the caller's telephone, and the directory assistance operator use the same Local Exchange Carrier (LEC). Calls meeting these requirements, known as "Intra-Local Access Transport Area (Intra-LATA) DACC" calls, permit the appropriate charge, which can be announced to the caller, to be determined promptly by the single LEC.

The NPNM service is preferably not available to a call where one of many Interexchange Carriers (IXCs) are used. These types of calls, known as Inter-LATA DACC calls, do not permit the proper charge to be determined promptly as different IXCs charge different amounts.

Accordingly, Intra-LATA Verifier Application 146 determines whether the call is an Intra-LATA call by checking whether the telephone number in data field 124, the caller's telephone number, and Operator Console 108 use the same LEC.

Figure 4:
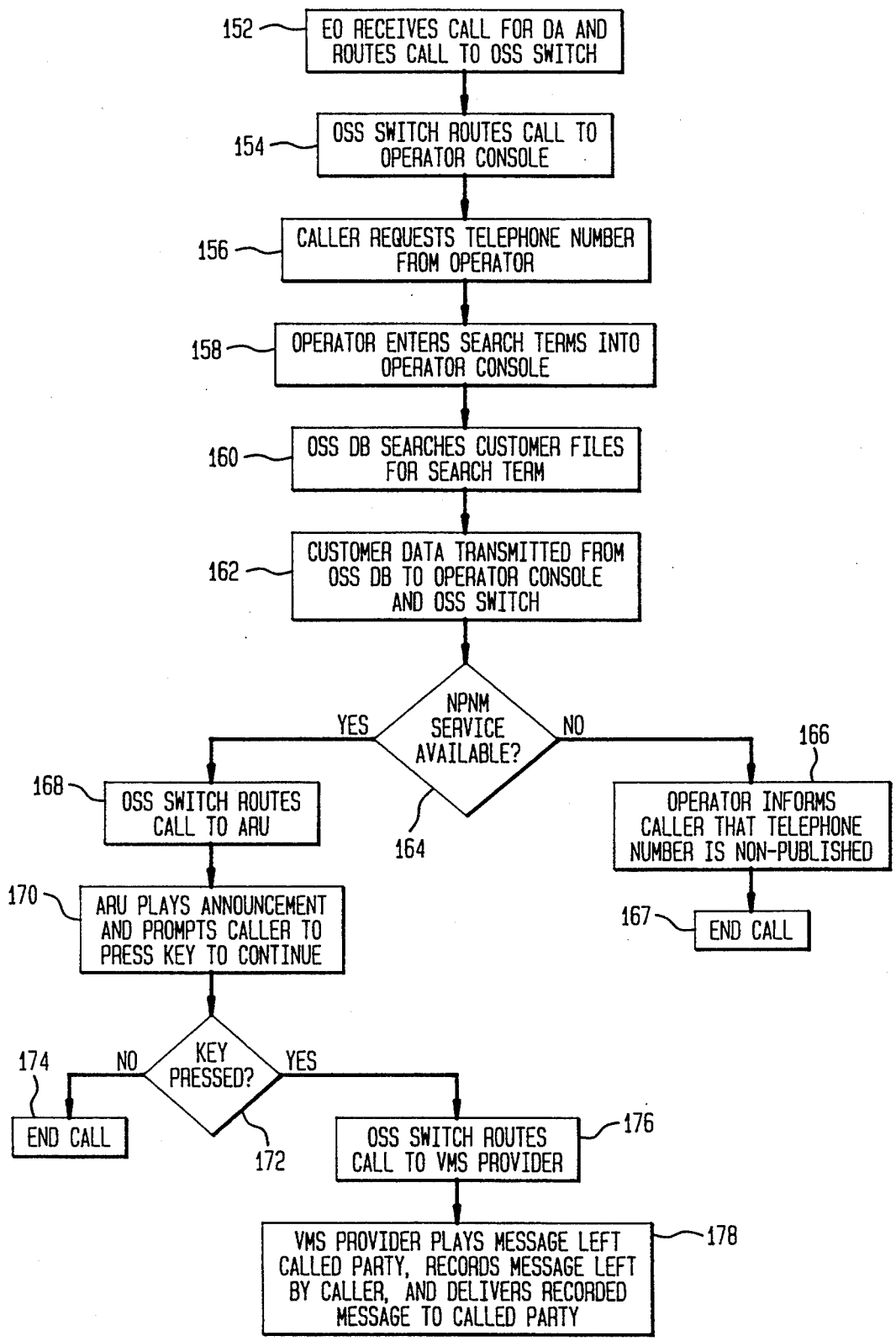
FIG. 4 is a flow diagram showing how a call is processed in accordance with one embodiment of the present invention.

FIG. 4 is a flow diagram showing how a call to a directory assistance service is processed in accordance with one embodiment of the present invention. When a call is placed from telephone 102 to directory assistance, EO 104 receives the call and routes the call to OSS Switch 106 (step 152). Upon receiving the call from EO 104, OSS Switch 106 routes the call to Operator Console 108 and establishes voice communication between a directory assistance operator at Operator Console 108 and the caller (step 154).

The caller requests the telephone number of a party from a directory assistance operator at Operator Console 108 (step 156). The operator enters search terms into Operator Console 108 and the search terms are transmitted to OSS DB 110 (step 158). OSS DB 110 searches the customer records for a record containing a search term (step 160). When a match is found, OSS DB 110 transmits the customer record to Operator Console 108 and OSS Switch 106 (step 162).

If the requested telephone number is nonpublished, OSS Switch 106 determines whether the NPNM service is available to the caller (step 164), as described in detail above. If the NPNM service is not available to the caller, the operator informs the caller that the telephone number is nonpublished and hangs up (steps 166 and 167).

If the NPNM is available to the caller, OSS Switch 106 routes the call to ARU 112 (step 168). ARU 112 then plays an announcement to the caller describing the NPNM service (step 170). In a preferred embodiment, this announcement informs the caller that the requested telephone number is nonpublished and explains the procedures and costs for leaving a message.

ARU 112 then prompts the caller to press a particular key to indicate that the caller would like to leave a message for the called party (step 170) and waits for the caller to press the key (step 172). If the caller does not press the appropriate key, the call is terminated (step 174). If the caller presses the appropriate key, then OSS Switch 106 routes the call to the VMS Provider 114 subscribed to by the called party along with the appropriate customer record (step 176).

VMS Provider 114 then plays for the caller a personalized message left by the called party or a VMS-provided automated message. At the appropriate time, the caller leaves a message for the called party, which is later delivered to the called party (step 178).

Under the NPNM service, VMS Provider 114 can deliver a message to the called party in a variety of ways. In a preferred embodiment, VMS Provider 114 determines whether the called party subscribes to a voice mail service provided by VMS Provider 114. If so, then the message is left in the called party's "mail box". The VMS provider 114 then alerts the called party to an existing message by transmitting a conventional stutter dial tone to the called party's telephone or by illuminating a visual message-waiting indicator on the called party's telephone.

If VMS Provider 114 determines that the called party does not subscribe to a voice mail service, then VMS Provider 114 attempts to deliver the message by generating calls to the called party. In a preferred embodiment, when the called party answers the call by VMS Provider 114, VMS Provider 114 prompts the called party to press a key to hear the message. The message is preferably delivered only if the called party presses the appropriate key to ensure that the call has been answered by a person rather than, for example, an answering machine. Answering machines do not have a standard "greeting-message" length or "beep" frequency; thus, it is undesirable to deliver a message to an answering machine since the message may not be recorded in its entirety.

VMS Provider 114 preferably attempts to deliver the message once an hour for up to 12 hours or until the message has been delivered. If the message is not delivered within this time, VMS Provider 114 erases the message and stops attempting to deliver the message. VMS Provider 114 may also temporarily cease call attempts during a designated period of overnight hours, such as 11 p.m. to 8 a.m. This time period may be designated by the called party and stored in OSS DB 110.

While there has been illustrated and described what are at present considered to be a preferred implementation and method of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and method disclosed herein, but that the invention include all embodiments falling within the scope of the appended claims.

What is claimed:

1. A method for providing a Nonpublished Number Messaging service in a telephone system which establishes connections between a calling party and a voice message system for a party having a non-published number, said method comprising the steps of:

receiving a call from a calling party requesting a telephone number corresponding to a called party the calling party desires to call;

accessing telephone information about the called party, said information including the requested telephone number, a first indicator that the requested telephone number is nonpublished, and a second indicator that the called party wishes to receive messages from callers requesting its telephone number;

determining that the requested telephone number is nonpublished; and responsive to said first and second indicators, routing the call to a voice message system and then recording a message from the calling party for the called party if the called party's telephone number is unpublished and the called party wishes to receive messages.

2. A method according to claim 1, further including the step of:

prompting the calling party to indicate an interest to leave a message for the called party prior to routing the call to said voice message system.

3. A method according to claim 1, further including the step of:

determining that the call is an Intra-Local Access Transport Area call prior to routing the call to said voice message system.

4. A method according to claim 1, further including the step of:

playing a recorded message to the caller prior to routing the call to said voice message system.

5. A method according to claim 4, wherein said recorded message describes the Nonpublished Number Messaging service to the caller.

6. A system for providing a Nonpublished Number Messaging (NPNM) service comprising:

a switch;

a database connected to said switch and storing directory assistance information about telephone customers;

an operator console connected to said switch and said database for accessing said directory assistance information and determining whether a particular telephone customer for whom directory assistance is requested has a nonpublished telephone number; and a voice mail service (VMS) connected to said switch for recording a message from a caller when the particular telephone customer has a nonpublished telephone number.

* * * * *